W. W. SMYTHE, Jr.
CONDUIT AND METHOD OF INSTALLING SAME.
APPLICATION FILED FEB. 16, 1917.
1,403,352.
Patented Jan. 10, 1922.
3 SHEETS—SHEET 1.
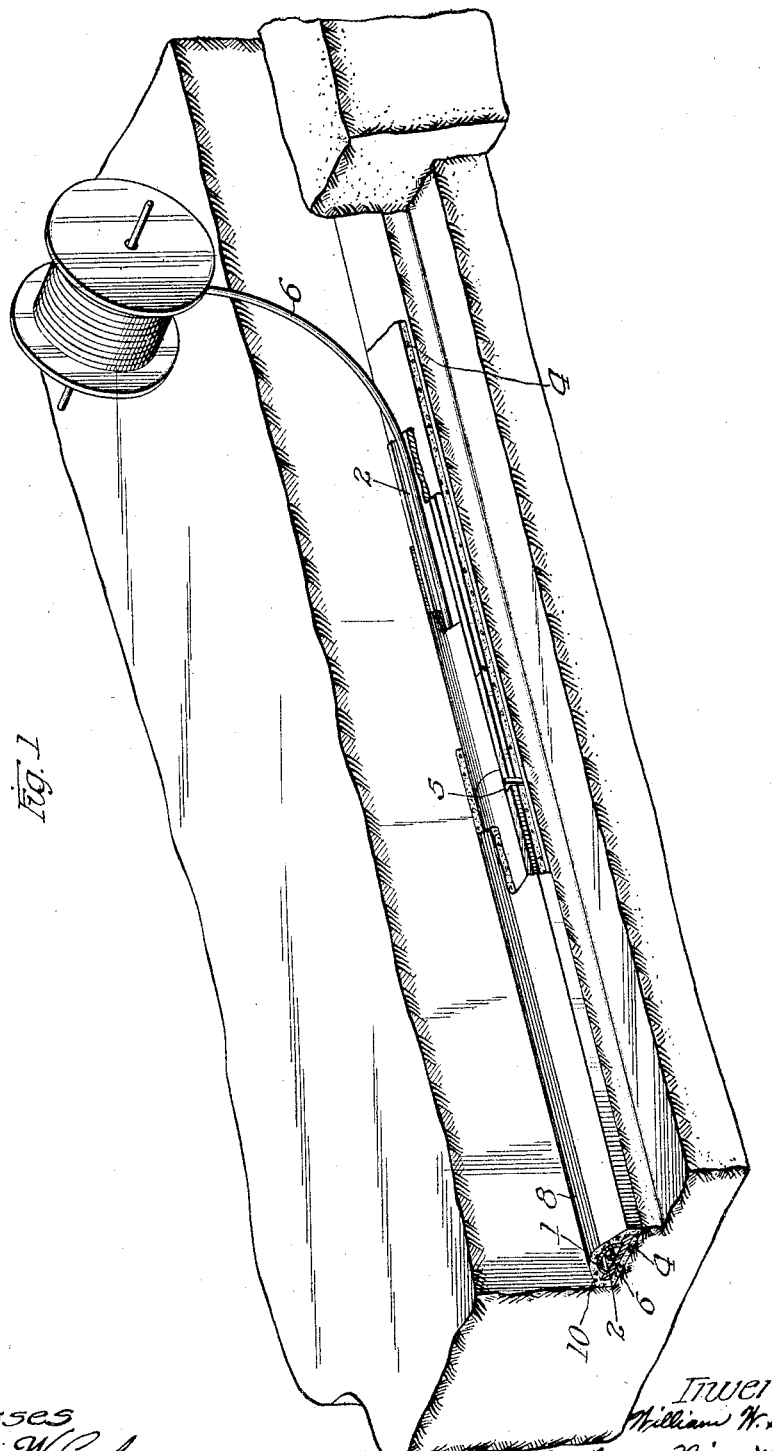

W. W. SMYTHE, Jr.
CONDUIT AND METHOD OF INSTALLING SAME.
APPLICATION FILED FEB. 16, 1917.
1,403,352.
Patented Jan. 10, 1922.
3 SHEETS—SHEET 2.
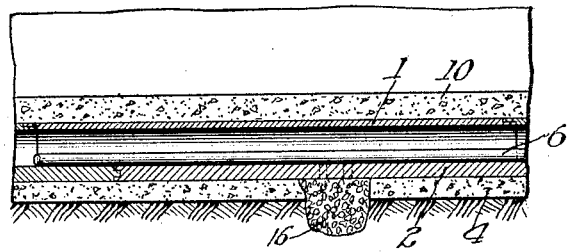
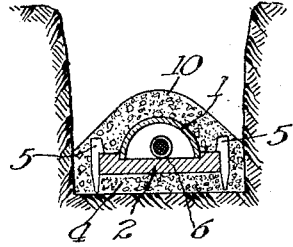
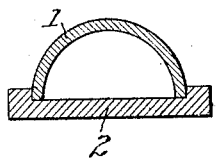
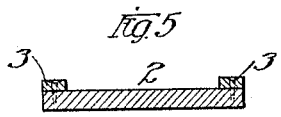
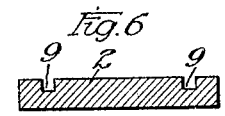
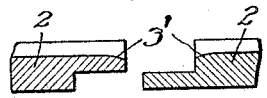
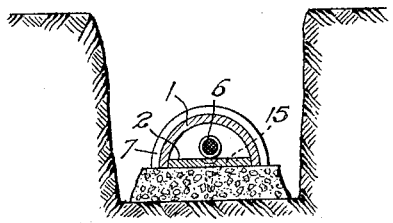
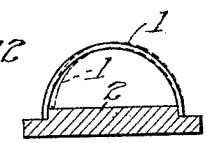
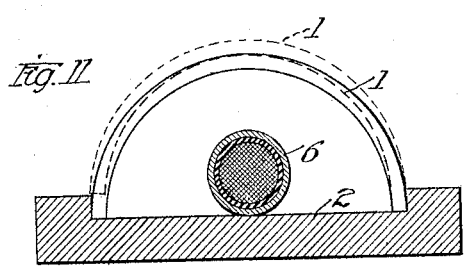

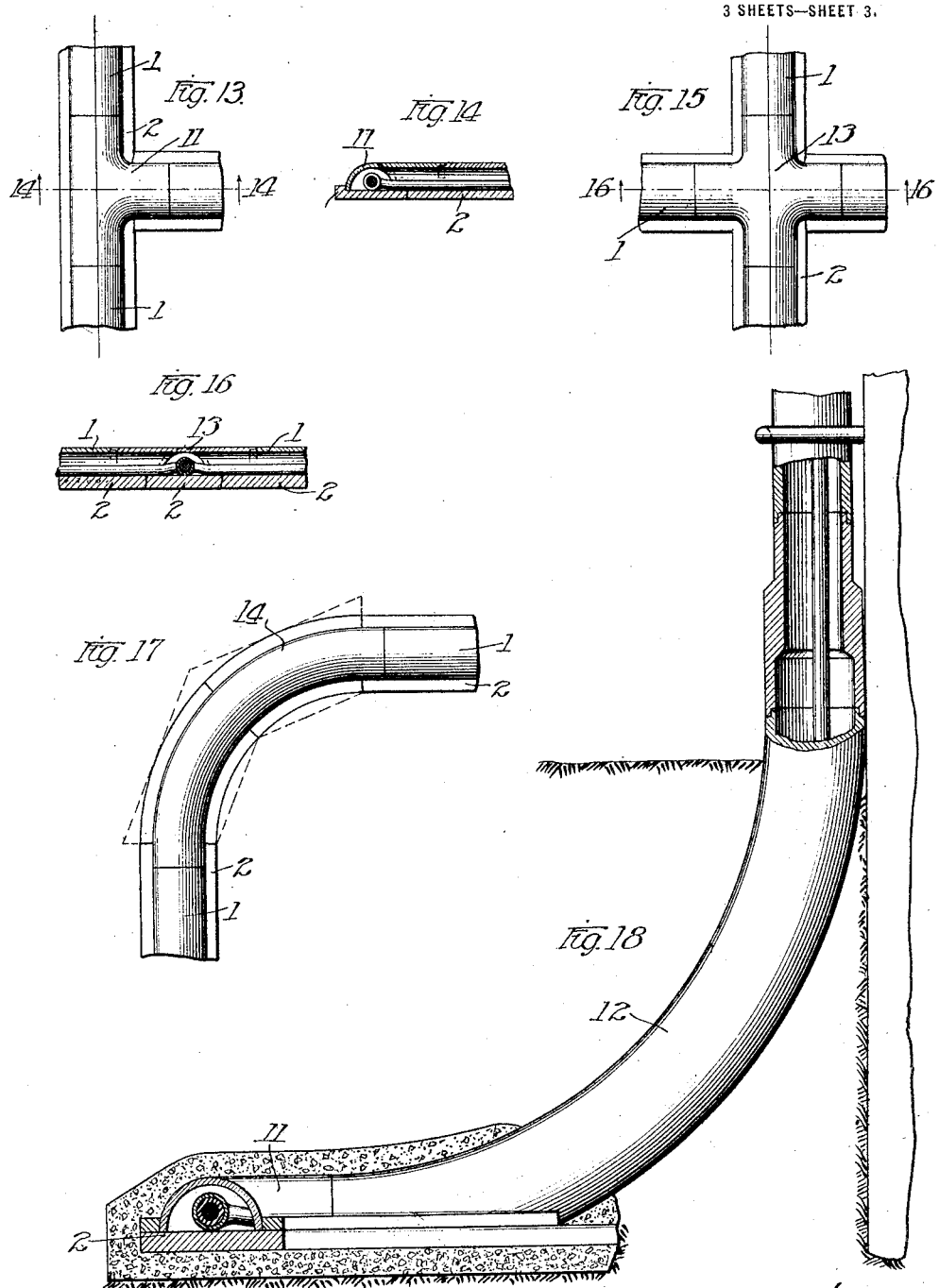

UNITED STATES PATENT OFFICE.

WILLIAM W. SMYTHE, JR., OF CHICAGO, ILLINOIS, ASSIGNOR OF ONE-HALF TO EDWIN H. SMYTHE, OF CHICAGO, ILLINOIS.

CONDUIT AND METHOD OF INSTALLING SAME.

1,403,352.

Specification of Letters Patent.  Patented Jan. 10, 1922.

Application filed February 16, 1917. Serial No. 149,125.

*To all whom it may concern:*

Be it known that I, WILLIAM W. SMYTHE, Jr., a citizen of the United States, residing at Chicago, in the county of Cook and State of Illinois, have invented certain new and useful Improvements in a Conduit and Method of Installing Same, of which the following is a specification.

My invention relates to an improved conduit and a method of installing the same simultaneously with the cable or conductors that are to be contained therein.

The principal object of my invention is to simplify and cheapen the process of installing electrical conductors or cable in conduits by providing an improved conduit, and an improved method of laying the conductors or cable in the conduit at the time the conduit system is installed, thereby doing away with the necessity of rodding the duct and drawing the cable into it, with the consequent risk of tearing or abrading the sheath of the cable; and also thereby reducing to a minimum the number of manholes in the conduit system and the number of splices in the conductors or cable in the conduit. A further object is to provide a conduit system easily and cheaply constructed, the ducts of which will have smooth interior surfaces and which will permit the conductors or cable initially installed to be afterwards withdrawn without injury to themselves or the conduit, and other conductors or cable to be drawn in in their place. As a result of my invention it becomes practical to install underground conduits and cable in places where otherwise considerations of economy would require the use of pole lines with aerial cables and overhead wires. By laying the cable rather than drawing it into the duct it is possible to carry the conduit run around corners without building manholes and introducing splices at the points where the direction of the run changes.

Generally stated, in practicing my invention in connection with an underground cable installation, a suitable foundation is prepared, as by excavating a trench and tamping the bottom to a level surface, or laying a floor of concrete. Upon this level surface or floor are laid a plurality of grooved or channelled flat strips, preferably of preservative-treated board placed end to end to provide a base of any desired length. The cable is then unreeled and placed on the base, after which a plurality of sections of open-sided conduit, preferably fiber conduit split longitudinally into half-duct, are inverted over the cable and placed end to end to form a continuous duct of larger internal dimensions than the external diameter of the cable. The joints between the sections of half-duct and between the half-duct and the baseboard are made tight, the duct is covered with concrete or firmly tamped earth, and the trench back-filled.

I will describe my invention by reference to the accompanying drawings, in which Fig. 1 is a perspective view, partly in section, of the conduit system of my invention in the process of installation; Figs. 2 and 3 are longitudinal and transverse sectional views of the completed conduit with the cable in place; Fig. 4 is a transverse section of one form of baseboard with the half-duct section in place upon it; Figs. 5, 6, 7 and 7ª are views in transverse section of modified forms of baseboard; Fig. 8 is a longitudinal section of the baseboard showing the manner in which the ends of the sections are prepared for fitting together; Fig. 9 is a view in transverse section of a trench and conduit employing the form of baseboard shown in Fig. 7ª; Fig. 10 is a sectional view of a joint between half-duct sections provided with a protecting sleeve or shield over the joint; Figs. 11 and 12 are transverse sectional views showing two ways in which the half-duct sections may be held by their elasticity to the associated baseboard sections; Figs. 13 and 14 are plan and sectional views respectively, of the construction employed for taking off a lateral from the main conduit run; Figs. 15 and 16 are plan and sectional views, respectively, of the construction employed for taking off two laterals in opposite directions from the main conduit run; Fig. 17 is a plan view of the construction employed where the direction of the conduit run changes; Fig. 18 is a view of the construction employed for taking off from the main conduit run a lateral lead to a distributing pole.

The sort of conduit that I prefer to use in practicing my invention is what is commonly known as fibre conduit, which is made by wrapping wet wood pulp or fibre in a thin film upon a forming mandrel under pressure until the desired thickness of wall is obtained. The tube thus formed is afterwards dried and saturated with an insulating and waterproofing compound. To adapt such conduit lengths or sections for use in connection with my invention, I split each section longitudinally, preferably into halves, thus producing from each length two half-duct sections 1. A plurality of such sections inverted and placed end to end form the upper and side walls of the duct.

The lower wall of the duct is preferably a smooth-surfaced board floor, formed of a plurality of long board strips 2 placed end to end. These board strips may be of creosoted yellow pine with the upper surface channelled or recessed to receive the lower edges of the overlying half-duct. The recessing of the base or lower wall sections may be effected by forming a single central channel in the upper surface of the board of a width approximately equal to the width of the lower side of the overlying half-duct, as illustrated in Fig. 4; or by nailing narrow strips 3 along the outside edges of the upper surface of the baseboard, as illustrated in Fig. 5; or by forming two grooves or recesses 9 along the two sides of the upper surface of the baseboard, as shown in Fig. 6; or by shouldering the opposite corners of the upper surface of the baseboard, as shown in Fig. 7; or in other ways which will readily suggest themselves to those practicing the invention. In order that the sections 2 of the baseboard may be joined together and held in alignment to present a continuous smooth upper surface to the cable, the ends of the sections may be ship-lapped, as illustrated in Fig. 8, and the corners of the upper surfaces where the boards meet may be beveled as indicated at 3' in Fig. 8.

Referring to Figs. 1, 2 and 3, in installing an underground conduit system in accordance with my invention, the trench is first excavated to the desired depth and the bottom of the trench tamped to an approximately level surface. Upon the bottom of the trench is then placed a foundation of concrete 4, which may have a thickness of say $1\frac{1}{2}''$ and a total width somewhat greater than the width of the baseboard that is to be laid upon this foundation. As the concrete foundation is formed, the baseboard sections 2 are placed upon it end to end, and if necessary, may be secured to the foundation by means of tent pegs 5 driven into the concrete before it takes its permanent set, and with the shoulders of the tent pegs gripping the outer edges of the baseboard sections.

When a suitable length of trench has thus been prepared, the cable 6 may be unreeled alongside of the trench, and then lifted into position upon the baseboard; or it may, if desired, be unreeled directly into the trench and onto the baseboard, as illustrated in Fig. 1. In introducing the cable into the trench in this manner, the reel of cable should be placed upon a suitable carriage and drawn along as near as practicable to the side of the trench or directly spanning the trench, and in such position as to permit the cable to unreel from the bottom as the reel is moved along the trench. In installing cables of the ordinary size or diameter, a distance of about 100 feet should be maintained between the reel and the point where the cable is descending into position on the baseboard in order that the cable may lie straight upon the base.

When the cable is in position and centered upon the baseboard, the half-duct sections 1 are inverted and placed over it, with their ends tightly fitted together and their edges resting in the channels or grooves of the baseboard sections; or if the baseboard is of rectangular cross-section and unprovided with grooves, as shown in Fig. 7ª, the half-duct may be placed so as to grasp with its inner edges the outer edges of the board as shown in Fig. 9, and the board may be secured to the concrete foundation by spikes or pegs 15 driven through the board before the concrete hardens.

In order to insure a tight joint between the edges of the half-duct and the grooves or recesses in the baseboard, the recesses or grooves and the edges of the sections are swabbed with a sealing compound. The joints between the half-duct sections are also swabbed with sealing compound. Tight joints between the half-duct sections may be made in a variety of ways, such as by using conduit that is provided with a mortise and tenon joint at the ends of the sections, as shown in Fig. 2, or by merely butting the sections and covering the joint with a half-sleeve 7, as shown in Figs. 9 and 10.

After the cable is laid on the baseboard sections, and the duct formed by covering the cable with the inverted half-duct sections, the whole may be held together and protected by a covering of concrete, which may be placed over the top of the half-duct to a thickness of say two inches, this protecting covering of concrete being extended over the baseboard and joining the concrete foundation upon which the baseboard is placed. The finished duct and cable are now as shown in section at 8 in Fig. 1, and when the protecting concrete has taken its initial set, the trench may be back-filled.

Where the character of the soil is such as to permit it, the concrete foundation and protecting shell may be omitted, the baseboards being laid upon the firmly tamped surface of the bottom of the trench and the earth firmly tamped about the duct after the cable is laid and the half-duct sections placed in position and the joints sealed.

I have illustrated in Figs. 11 and 12 a form of construction in which the half-duct sections are held securely to the baseboard by being sprung into its channel or groove. In the form of this construction illustrated in Fig. 11, the channel is formed so that the distance between its inner walls is a little less than the distance between the outer edges of the half-duct sections. When the parts are assembled after the cable is laid in position upon the baseboard, the lower edges of the half-duct sections are forced together by means of a suitable tool far enough to permit the edges to enter the channel; and upon permitting the sides of the half-duct to spring outwardly, due to the natural resiliency of the duct, the outer edges are brought tightly into engagement with the inner walls of the channel. Or, as illustrated in Fig. 12, the inner walls of the shoulders along the outer edges of the baseboard may be spaced so as to lie slightly farther apart than the internal diameter of the half-duct section, and the lower edges of the section may be sprung tightly into the grooves or recesses by slightly expanding with a suitable tool the lower side of the section when it is assembled with the baseboard after the cable is laid in position.

In systems of cable installation it is usually necessary that provision be made for distributing the conductors of the cable to make them available at different points. This is ordinarily done by tapping off from the cable, leads carrying multiple connections or individual extensions of as many of the conductors as it is desired to make available at that point. The manner in which this is accomplished in my conduit system is illustrated in Figs. 13, 14, 15, 16 and 18. The condition shown in Figs. 13 and 14 is one in which a single lateral is tapped off the main cable. This is accomplished by introducing a T half-duct 11 into the main duct run, the lateral arm of the T being joined to the half-duct sections which constitute the lateral duct. This duct is formed of base sections and half-duct sections in the same manner as the main duct. The T half-duct may be formed by splitting a T into halves longitudinally. When the point is reached where the lateral lead is to be taken off the main cable and conduit the lateral cable is spliced on, and the splice sheathed in the usual manner.

Fig. 18 illustrates the manner in which a lateral lead, such as that described above, may be carried up a distributing pole. This is accomplished by using a bend 12 of any desired or convenient radius. The lower end of the bend is split at right angles to the plane of the bend so that the cut end forms a half-duct section which may rest upon a baseboard and be joined directly to the lateral extension of the half-duct T. The lateral cable is cut off and sealed so as to leave a length sufficient to reach the top of the distributing pole, and is threaded through the bend 12, the bend then being placed in position to connect with its half-duct and secured in place by the application of concrete in a manner already described.

Where two lateral leads are to be taken off at right angles to the main lead, the construction may be as illustrated in Figs. 15 and 16. This construction involves the introduction of a half-cross 13 into the main lead, the half-cross being produced by splitting a cross in two longitudinally. Two opposite arms of the cross are joined to the half-duct sections in the main lead, and the other two arms of the cross are joined with the half-duct sections of the lateral ducts. The cable is cut at the point where the tap leads join the main lead, the lateral or tapped cables are spliced onto the main cable, and the splice sheathed. The half-cross is then placed over the splice with its main and lateral branches, the joints sealed, and concrete applied in the manner already described.

Where the direction of the conduit changes, a half-bend 14, made by splitting a bend longitudinally, may be introduced as illustrated in Fig. 17.

It may be seen that with this construction, the lateral branches or tap leads may be taken off from the main lead without it being necessary to build manholes. These points may be marked, or a record kept of them, so that if at any time in the future it should be desired to pull out the cable and draw new cable into the duct, excavations can be made at such points and, if desired, manholes constructed. In the initial installation no manholes whatever are required, as when the full length of cable carried on a reel is laid in position, another length may be spliced directly to the first length and the process of installation proceeded with.

To provide for drainage the conduit run may be given a pitch to low points at suitable intervals; and at these low points the baseboard may be perforated to afford communication between the interior of the duct and an underlying bed of loose rock or gravel as shown at 16 in Fig. 2.

In a system of cable installation which has been practiced to some extent, the cable is laid upon a concrete foundation and is then covered with concrete so that it is solidly imbedded therein. This method of installation is cheap and simple; but it is impossible to salvage the cable thus installed, or readily and economically repair the same. In my system of cable installation, the advantages of simplicity and cheapness of installation over the ordinary draw-in method are retained, and at the same time it is possible to draw out for salvage or repair the cable initially installed, and draw into the same duct another cable, the smooth board floor of the duct minimizing friction and the possibility of tearing or abrasion of the cable sheath.

What is claimed is:

1. An electrical conductor duct comprising a foundation of relatively hard material; a smooth base of relatively soft material on said foundation; pins disposed in the foundation and having their heads engaging said base, locking the latter to the foundation; a hollow cover of relatively soft material on said base; and a relatively hard material disposed over said base and cover and attached to said foundation.

2. An electrical conductor duct comprising a concrete foundation having its top substantially flat; a member of smoothed-surfaced sheet material substantially semi-circular in cross-section and curved upwardly on said foundation; a concrete body disposed over said sheet material member and rigidly attached to the foundation; and means forming a relatively soft flat smooth surface over the flat top of said foundation and in engagement with the edges of said sheet material member.

3. An electrical conductor duct construction comprising a foundation having openings therein; absorbent material in said openings; a base on the foundation having openings registering with the openings in said foundation; a semi-cylindrical cover on the base; and means securing the base and cover to said foundation.

4. The method of conduit installation which consists in repairing a flat concrete base, providing the base with a smooth, flat upper surface to serve as a lower duct wall, laying over said smooth, flat upper surface inverted sections of open-sided conduit arranged end-to-end, and applying concrete upon said base and over said conduit sections.

5. The method of conduit installation which consists in preparing a flat concrete base, providing the base with a smooth, flat upper surface to serve as a lower duct wall, applying sealing means to appropriate parts of said upper surface, laying over said smooth upper surface of the base inverted sections of open-sided conduit arranged end-to-end and with their edges in engagement with said sealing means and applying a protecting layer of concrete over said conduit sections.

In testimony whereof I have signed my name to this specification on this 13th day of February, A. D. 1917.

WILLIAM W. SMYTHE, Jr.

Witnesses:
 EDWIN H. SMYTHE,
 ARTHUR L. SPRINKLE.